(12) United States Patent
Weiss et al.

(10) Patent No.: US 7,645,532 B2
(45) Date of Patent: Jan. 12, 2010

(54) SOLID-OXIDE FUEL CELL SYSTEM HAVING AN UPSTREAM REFORMATE COMBUSTOR

(75) Inventors: Amanda M. Weiss, Livonia, NY (US); Subhasish Mukerjee, Rochester, NY (US); Karl J. Haltiner, Jr., Fairport, NY (US); Gregory W. Alexander, Pittsford, NY (US)

(73) Assignee: Delphi Technologies, Inc., Troy, MI (US)

( * ) Notice: Subject to any disclaimer, the term of this patent is extended or adjusted under 35 U.S.C. 154(b) by 881 days.

(21) Appl. No.: 10/909,577

(22) Filed: Aug. 2, 2004

(65) Prior Publication Data
US 2006/0024541 A1     Feb. 2, 2006

(51) Int. Cl.
*H01M 8/18*     (2006.01)
*H01M 8/04*     (2006.01)

(52) U.S. Cl. ............................... 429/20; 429/22; 429/26
(58) Field of Classification Search .................... 429/17, 429/20, 22, 30
See application file for complete search history.

(56) References Cited

U.S. PATENT DOCUMENTS 5,968,680 A * 10/1999 Wolfe et al. .................... 429/13
6,123,873 A * 9/2000 Primdahl ..................... 252/376
6,309,770 B1 * 10/2001 Nagayasu et al. ............. 429/19
2002/0131907 A1 * 9/2002 Iwasaki ....................... 422/110
2002/0155331 A1 * 10/2002 Kamegaya et al. ............ 429/19
2005/0058859 A1 * 3/2005 Goebel ........................ 429/17
2005/0130085 A1 * 6/2005 Kamijo .......................... 431/6

* cited by examiner

*Primary Examiner*—Patrick Ryan
*Assistant Examiner*—Muhammad Siddiquee
(74) *Attorney, Agent, or Firm*—Thomas N. Twomey

(57) ABSTRACT

A solid-oxide fuel cell system wherein a reformate combustor is disposed in the reformate flow path between a hydrocarbon reformer and a fuel cell stack. At system start-up, reformate is partially burned within the combustor by admitting combustion air, and the partially-burned reformate is passed through the anode chambers of the stack to warm the anodes. In addition, reformate is passed through a cathode-air heat exchanger to warm combustion air entering the cathode chambers of the stack. The combustor may continue to be supplied with a low level of air during steady-state operation of the SOFC, thereby providing a moist environment within the anode chambers to prevent coking of the anodes and providing additional heat to the reformate. The combustor decouples the reformer from the stack thermodynamically, permitting the reformer and the stack each to run in its own optimal temperature range.

11 Claims, 1 Drawing Sheet

SOLID-OXIDE FUEL CELL SYSTEM HAVING AN UPSTREAM REFORMATE COMBUSTOR

This invention was made with Government support under DE-FC26-O2NT41246 awarded by DOE. The Government has certain rights in this invention.

TECHNICAL FIELD

The present invention relates to hydrogen/oxygen fuel cells having a solid-oxide electrolytic layer separating an anode layer from a cathode layer; more particularly, to fuel cell assemblies comprising a plurality of individual fuel cells in a stack wherein hot reformate is employed to fuel the stack; and most particularly, to such a fuel cell system including a combustor between the reformer and the stack for allowing the reformer to operate at a more favorable, lower temperature.

BACKGROUND OF THE INVENTION

Fuel cells which generate electric current by controllably combining elemental hydrogen and oxygen are well known. In one form of such a fuel cell, an anodic layer and a cathodic layer are separated by a permeable electrolyte formed of a ceramic solid oxide. Such a fuel cell is known in the art as a "solid-oxide fuel cell" (SOFC). Hydrogen, either pure or reformed from hydrocarbons, is flowed along the outer surface of the anode and diffuses into the anode. Oxygen, typically from air, is flowed along the outer surface of the cathode and diffuses into the cathode. Hydrogen typically is derived by catalytically reforming hydrocarbons such as gasoline in the presence of limited oxygen.

A single cell is capable of generating a relatively small voltage and wattage, typically between about 0.5 volt and about 1.0 volt, depending upon load, and less than about 2 watts per $cm^2$ of cell surface. Therefore, in practice it is known to stack together, in electrical series, a plurality of cells.

An SOFC system requires stack temperatures above about 750° C. for electricity generation. Optimal steady-state operating temperatures may be 850° C. or even higher. A known problem in the art is how to raise the stack elements to at least the threshold temperature at start-up. It is known to use the reformate being supplied to the stack as a heat transfer agent. At air/fuel ratios at or near stoichiometric partial oxidation, or POX, a POX reformer operates at a temperature of about 700° C. to about 950° C. However, if the fuel/air mixture provided to the reformer is made fuel-lean (that is, more combustion in the reformer), the output temperature can be raised even further. Operating in this mode, the reformer will produce more water and carbon dioxide, and less methane.

Two problems are encountered when operating the reformer at or near stoichiometric POX. First, the reformate stream can still include some residual non-reformed hydrocarbons, which can cause coking of the anodes in the stack, a highly undesirable condition. Second, elevated temperatures within the reformer can shorten the life of, or directly damage, the catalytic elements in the reformer. Operating the reformer in a more fuel-lean condition reduces methane and hydrocarbons and increases water in the reformate stream, both of which reduce the potential of coking of the anodes. However, operating in this mode increases the reformate temperature, further reducing the life of the catalytic elements.

What is needed is a means for fueling the SOFC stack without coking of the anodes.

What is further needed is a means for providing sufficient water and reduced methane to the stack without causing overheating of the reformer catalyst.

It is a principal object of the present invention to fuel an SOFC stack without requiring overheating of the reformer catalyst.

BRIEF DESCRIPTION OF THE INVENTION

Briefly described, in a solid-oxide fuel cell system wherein a hydrocarbon reformer provides reformate to a fuel cell stack, a device for causing a partial oxidation reaction downstream of the reformer, such as a reformate combustor, is inserted in the reformate flow path therebetween. At system start-up, as soon as the reformer begins making reformate, the reformate is partially burned within the combustor by controllably admitting combustion oxygen, and the combustion exhaust is passed through the anode chambers of the stack to warm the anodes. In addition, the partially-burned reformate may be passed through a cathode-air heat exchanger before entering the stack to warm the air entering the cathode chambers of the stack, thus further assisting in overall heating of the stack. The combustor may also continue to be supplied with a low flow of combustion air, and limited combustion may be maintained in the combustor during steady-state operation of the SOFC, thereby providing continuously a moist environment within the anode chambers which prevents coking of the anodes by residual hydrocarbons in the reformate, and also providing additional heat to the reformate. The combustor thus effectively decouples the reformer from the stack thermodynamically, allowing the reformer and the stack each to run in its own optimal temperature range, and preventing coking of the anodes.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
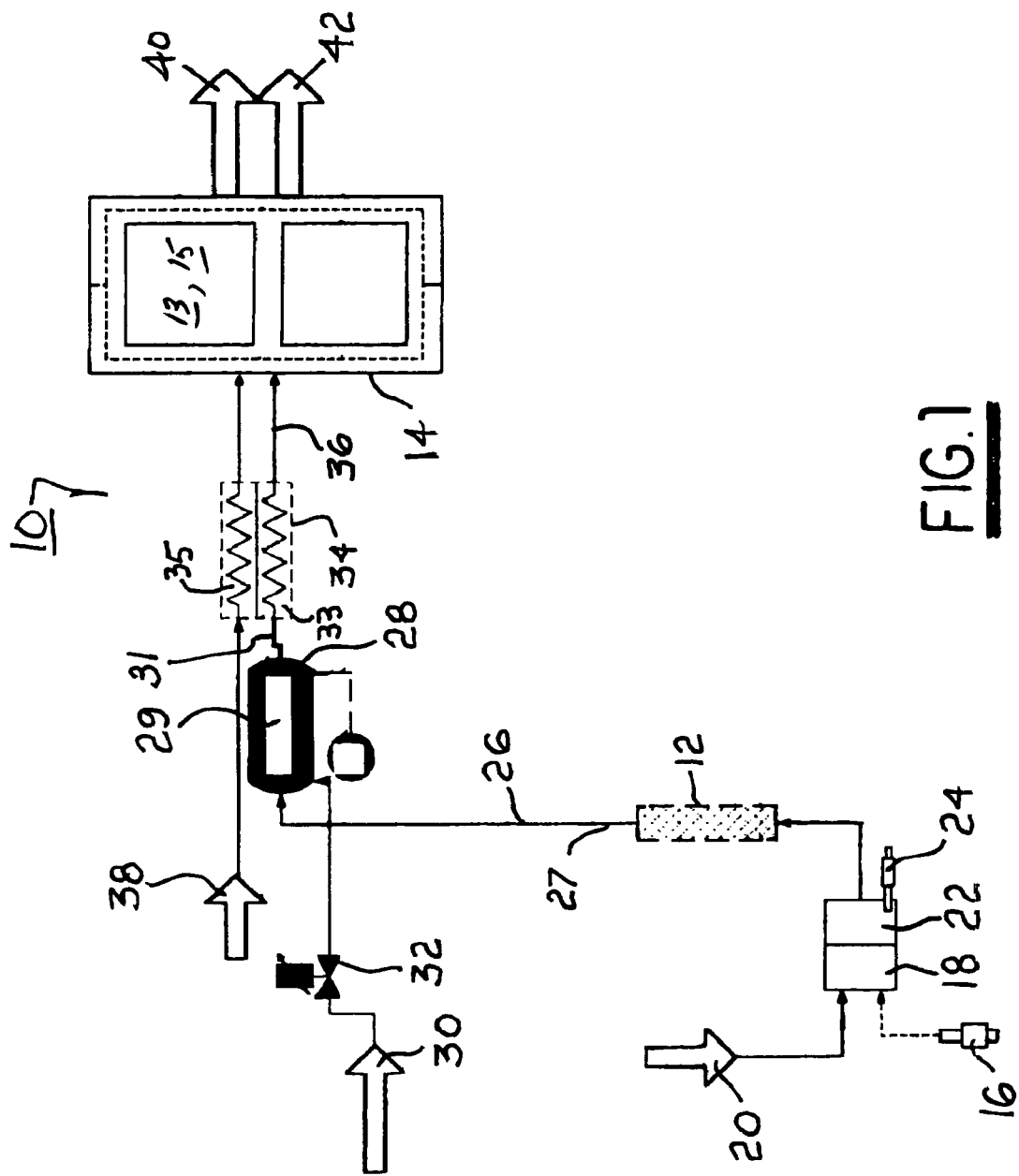
FIG. 1 is a schematic drawing of a reformer, combustor, and fuel cell stack arranged for operation in accordance with the invention.

Referring to FIG. 1, a fuel cell system 10 is shown wherein a reformer 12 is thermodynamically decoupled from an SOFC fuel cell stack 14, permitting the reformer and the stack each to run in its own optimal temperature range, thereby inhibiting coking of anodes in the SOFC stack; minimizing thermal degradation of the reformer; increasing efficiency of the stack; and permitting the stack to reach threshold operating temperature more quickly from start-up.

Hydrocarbon fuel is injected via a fuel injector 16 into a reformer vaporizer 18. Reformer inlet air 20, from an air source such as an air pump (not shown), is also admitted to vaporizer 18 wherein the fuel and air are mixed and the fuel is vaporized. The vaporized fuel is passed through a start-up reformer combustor 22 equipped with an igniter 24 such that the vaporized fuel may be burned in combustor 22 at start-up and the hot, burned gases passed sequentially through reformer 12 and stack 14 to provide immediate heating of those components. Preferably, vaporizer 18 and reformer combustor 22 are integral with reformer 12 although shown separately here for clarity. When reformer 12 reaches a threshold reforming temperature of about 550° C., ignition is terminated and reforming of hydrocarbons is initiated. The fuel/air ratio in vaporizing chamber 18 is modified as optimal for reforming, and the temperature of the reformate 27 issuing from reformer 12 via line 26 is between about 700° C. and about 950° C.

A reformate partial combustor 28 is provided in line 26 between reformer 12 and stack 14, having a chamber 29 for receiving reformate from the reformer. Partial combustion air 30 is controllably provided at a predetermined flow rate via control valve 32 into chamber 29 and therein partially combusts the reformate to generate heat, water, and carbon dioxide. The partially combusted reformate 31 is passed to the anode side 13 of stack 14 to rapidly warm that portion of the stack and commence generation of electricity. Preferably, the reformate is passed through a first side 33 of cathode air heat exchanger 34, provided in line 36 between combustor 28 and stack 14 and preferably integral with combustor 28, to heat the incoming cathode air 38 passing through second side 35 of heat exchanger 34 and thereby assist in heating the stack from the cathode side 15. Spent cathode air 40 and anode tail gas 42 are exhausted from stack 14 in known fashion, and heat may be recovered therefrom in some applications (not shown). For example, the tail gas may be recycled into the reformer to assist in bringing the reformer to optimum temperature and to improve fuel efficiency. A preferred exit temperature range for anode tail gas is between about 800° C. and about 1000° C., preferably about 850° C.

The amount of combustion carried out in combustor chamber 29 is controlled by air flow through valve 32. Because of the temperature of the reformate in chamber 29, no separate ignition source is required; the desired combustion takes place spontaneously upon admission of air to the reformate. However, an igniter could be added if required.

In some applications, it may be desirable to continue to provide some level of partial combustion in chamber 29 even at steady-state operation of stacks 14, in order to provide continuous moisture and heat into the reformate and thereby protect the anodes from coking.

While the device for causing a partial oxidation reaction in the preferred embodiment is described as a reformate combustor, it is understood that the device for causing a partial oxidation reaction may be alternatively, for example, a catalytic combustor or an oxygen transmission membrane, within the scope of the invention.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A solid oxide fuel cell system, comprising:
   a) a fuel cell stack including cathodes and anodes;
   b) a hydrocarbon reformer for providing reformate to said anodes;
   c) a combustor operationally disposed between said reformer and said stack for controllably adding a volume of air to said reformate to partially combust said reformate to provide moisture and heat to said anodes; and
   d) a heat exchanger operationally disposed between said combustor and said stack such that said partially-combusted reformate may be passed through a first side of said exchanger and cathode intake air may be passed through a second side of said exchanger to heat said cathode intake air.

2. A fuel cell system in accordance with claim 1 wherein said volume of air is selected to permit said reformer to be operated in a temperature range between about 700° C. and about 950° C., and to permit said stack to be operated in a temperature range between about 800° C. and about 1000° C.

3. A method for operating a fuel cell system including a hydrocarbon reformer operated in a first temperature range for providing reformate and a fuel cell stack operating in a second and independent temperature range for generating electricity from the reformate, the fuel cell stack including anodes and cathodes, the method comprising the steps of:
   a) providing a reformate combustor between said reformer and said stack;
   b) providing a heat exchanger between said combustor and said stack, said heat exchanger having a first side and a second side;
   c) operating said reformer at a selected fuel/air ratio to generate said reformate in said first temperature range;
   d) passing said reformate into said combustor;
   e) admitting air into said combustor at a controlled flowrate to cause heating of said reformate by at least partial combustion thereof;
   f) passing said at least partially-combusted reformate through said first side of said heat exchanger and passing cathode intake air through said second side of said heat exchanger to heat said cathode intake air; and
   g) passing said at least partially-combusted reformate into said fuel cell stack,
   wherein said combustor air flowrate is selected such that said fuel cell stack is caused to operate within said second temperature range.

4. A method in accordance with claim 3 wherein said first temperature range is between about 700° C. and about 950° C. and wherein said second temperature range is between about 800° C. and about 1000° C.

5. A solid oxide fuel cell system, comprising:
   a) a fuel cell stack including cathodes and anodes;
   b) a hydrocarbon reformer for providing reformate to said anodes;
   c) a partial oxidation reactor disposed between said reformer and said stack to partially oxidize said reformate to provide moisture and heat to said anodes; and
   d) a heat exchanger operationally disposed between said partial oxidation reactor and said stack such that said partially-oxidized reformate may be passed through a first side of said exchanger and cathode intake air may be passed through a second side of said exchanger to heat said cathode intake air.

6. A solid oxide fuel cell system, comprising:
   a) a fuel cell stack including cathodes and anodes;
   b) a hydrocarbon reformer for providing reformate to said anodes;
   c) a first combustor operationally disposed upstream of said reformer for controllably combusting fuel to produce heat, wherein said heat is conveyed to said reformer until said reformer reaches a threshold reforming temperature;
   d) a second combustor operationally disposed between said reformer and said stack for controllably adding a volume of air to said reformate to partially combust said reformate to provide moisture and heat to said anodes; and
   e) a heat exchanger operationally disposed between said second combustor and said stack such that said partially-combusted reformate may be passed through a first side of said exchanger and cathode intake air may be passed through a second side of said exchanger to heat said cathode intake air.

7. A fuel cell system in accordance with claim 6 wherein said first combustor is integral with said reformer.

8. A fuel cell system in accordance with claim 6 further comprising a vaporizer disposed upstream of said first combustor, wherein said fuel is mixed with air to form a fuel/air mixture, and wherein said fuel/air mixture is vaporized in said vaporizer prior to being combusted by said first combustor.

9. A fuel cell system in accordance with claim 8 wherein said first combustor and said vaporizer are integral with said reformer.

10. A fuel cell system in accordance with claim 6 wherein said threshold reforming temperature is about 550° C.

11. A method in accordance with claim 3 further comprising the steps of:
  providing a source of fuel to said reformer;
  providing a source of air to said reformer that is separate from said source of fuel, wherein said source of air and said source of fuel are mixed to form said selected fuel/air ratio.

\* \* \* \* \*